United States Patent [19]

Brinkmann

[11] 4,090,075

[45] May 16, 1978

[54] METHOD AND APPARATUS FOR MASS ANALYSIS BY MULTI-POLE MASS FILTERS

[76] Inventor: Uwe Hans Werner Brinkmann, Benquestr. 29, Bremen, Germany

[21] Appl. No.: 624,746

[22] Filed: Oct. 23, 1975

Related U.S. Application Data

[63] Continuation-in-part of Ser. No. 122,899, Mar. 10, 1971, abandoned.

[30] Foreign Application Priority Data

Mar. 17, 1970 Germany ............................ 2012479

[51] Int. Cl.[2] ............................................ B01D 59/44

[52] U.S. Cl. .................................... 250/282; 250/292

[58] Field of Search ............... 250/281, 282, 283, 292, 250/290

[56] References Cited

U.S. PATENT DOCUMENTS

| | | | |
|---|---|---|---|
| 2,950,389 | 8/1960 | Paul | 250/292 |
| 3,413,463 | 11/1968 | Brubaker | 250/292 |
| 3,527,939 | 9/1970 | Dawson | 250/292 |
| 3,579,270 | 5/1971 | Daly | 250/282 |

FOREIGN PATENT DOCUMENTS

| | | | |
|---|---|---|---|
| 1,225,430 | 3/1971 | United Kingdom | 250/292 |

*Primary Examiner*—Craig E. Church
*Attorney, Agent, or Firm*—Charles Hieken

[57] ABSTRACT

An ionized substance to be analysed is applied to a quadrupole filter that establishes stable and unstable ion trajectories dependent upon the potential applied to the poles. Varying this potential determines which mass line spectrum will be transmitted to an analyser at the output of the filter.

4 Claims, 7 Drawing Figures

Fig.1
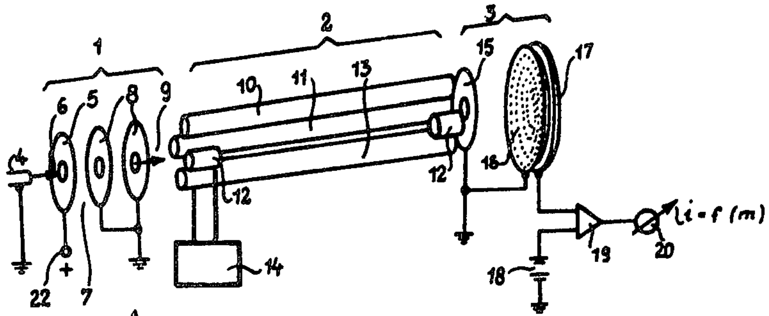
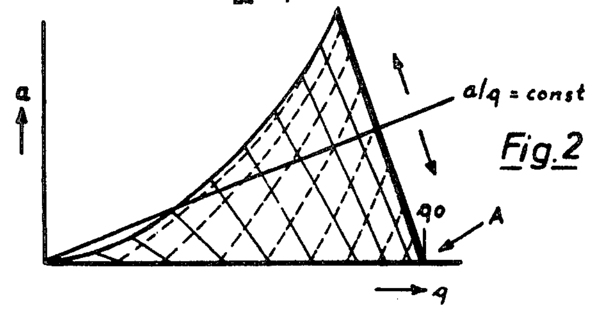
Fig.2
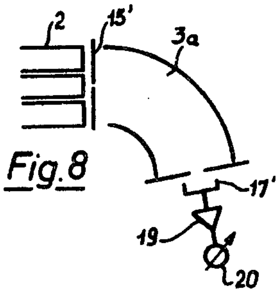
Fig.8
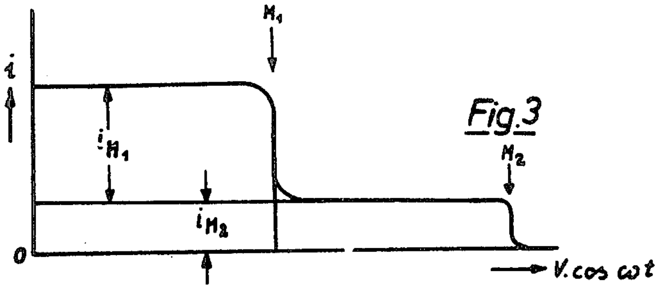
Fig.3
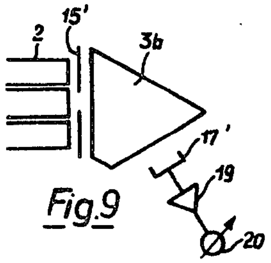
Fig.9
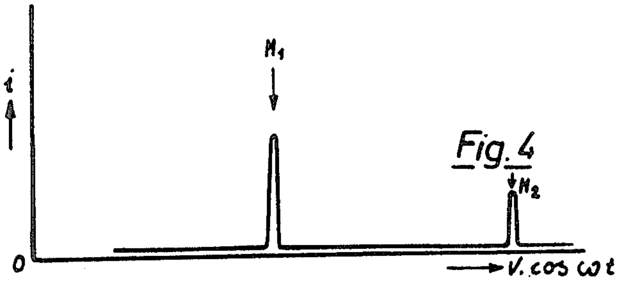
Fig.4
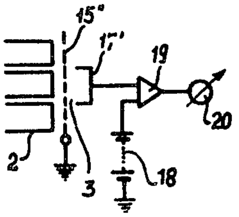
Fig.7
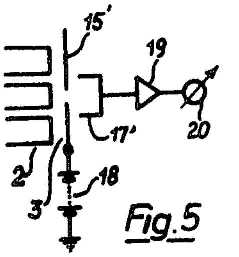
Fig.5
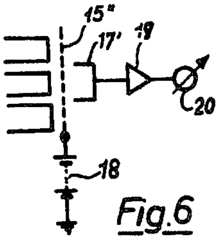
Fig.6

METHOD AND APPARATUS FOR MASS ANALYSIS BY MULTI-POLE MASS FILTERS

CROSS-REFERENCE TO RELATED APPLICATION

This application is a continuation-in-part of copending application Ser. No. 122,899 filed Mar. 10, 1971, and now abandoned.

BACKGROUND OF THE INVENTION

The invention relates to a method and apparatus for mass analysis by multi-pole mass filters in which the ions are subjected to a mass separation by an alternating multi-pole electric field of high frequency within a multi-pole mass filter, preferably a quadrupole mass filter by PAUL, having a stability diagram $a=f(q)$ wherein $a$ and $q$ are parameters dependent on the field voltages at the poles of the multi-pole field (Paul, Raether, Z. Physik 152, page 262, 1955 and Paul, Reinhard, von ZAHN, Z. Physik 152, page 143, 1958). Mass separation is based on the fact that the paths of the ions in the electric field of such mass filters are mass-dependent.

Mass filters of the character described mostly suffer from a serious loss of transmission efficiency towards the range of high masses.

In order to overcome this disadvantage BRUBAKER (U.S. Pat. No. 3,129,327) has proposed to combine with the four primary electrodes four auxiliary electrodes at the entrance of the quadrupole mass filter to produce a decrease in the ratio of the D.C. to A.C. voltage of the quadrupole electric field in the vicinity of said entrance.

The problem underlying the invention is to provide a method and apparatus as defined above by which a high resolution combined with a satisfying sensitivity for heavy masses is obtainable.

In the solution of this problem, the invention proceeds from the consideration that the ions at the exit of the quadrupole field have different energies depending on the location of the working point within the stability diagram $a=f(q)$ of the differential equations defining the trajectories of the ions within the quadrupole field and that especially the kinetic energy of those ions the trajectories of which are corresponding to working points near the upper margin of the triangular area of stability within the stability diagram is essentially higher than the energy of ions following trajectories more away from said upper margin. Therefore, it is possible to separate ions belonging to certain working points $(a,q)$ near the upper margin of the stability diagram by the help of an energy discriminating field succeeding to the exit of the quadrupole field. In particular it has been observed that ions the trajectories of which within the quadrupole field are located at the margin of the stability diagram have energies characteristically different from the energies of ions at working points more distant from said margin. The energies of said ions are higher than those of other ions, so that it is possible to separate these ions from the other ions, i.e., by a retarding field at the exit of the quadrupole field. Now, as the location of the working point within the stability diagram is mass-dependent such a separation method can be used to realize a mass spectrometer or narrow-band mass filter.

SUMMARY OF THE INVENTION

The invention thus broadly consists in that the mass filter is operated as a broad band or high pass mass filter and that the working points $a_1, q_1; a_2, q_2 \ldots$ in the stability diagram are shifted by variation of quantities defining the values of parameters $a$ and/or $q$ as, i.e., by variation of the A.C. field voltage $V \cdot \cos\omega t$ and/or the D.C. field voltage U from the area of stability beyond the margin of stability (lying towards higher values of the parameter $q$) or vice versa and that the ions passing the mass filter are subjected to an energy discriminating procedure thereby realizing a line spectrum of all masses $M_1, M_2 \ldots$ the ions of which by said variation of the A.C. voltage $V \cdot \cos\omega t$ and/or D.C. voltage are brought into the neighborhood of the upper margin of stability. This method of mass separation especially has the advantage that it is possible to obtain a line spectrum with a high transmission and corresponding high sensitivity as well as a high resolution. Moreover the new method can be performed also in the absence of a static field component in the multi-pole field so that the high expenditure for the stabilization of the static field component can be renounced at and only A.C. voltages can be used to produce the multi-pole field.

The energy separating field which as already has been said above performes a mass analysation can be realized be very simple component parts preferably consisting of an energy barrier discriminator, i.e., in the form of a retarding electrode.

Reference will now be made to the accompanying drawing which is given by way of example and in which

BRIEF DESCRIPTION OF THE DRAWING

FIG. 1 is a quadrupole mass filter with a succeeding energy barrier discriminator with spherical shaped retarding electrode as energy separating system according to the invention, FIG. 2 is a diagram illustrating the operating of the mass filter in FIG. 1, FIG. 3 is a diagram of the ion current at the exit of the quadrupole mass filter in the absence of the succeeding energy separating system, in total ion current operating mode, FIG. 4 is a diagram of the ion current behind the succeeding energy separating system, FIG. 5 is a side view of an energy barrier discriminator with an apertured disk lens as retarding electrode, FIG. 6 is a side view of an energy barrier discriminator with an even net-shaped retarding electrode, FIG. 7 is a side view of an energy barrier discriminator with a conventional collector as retarding electrode,

DETAILED DESCRIPTION OF PREFERRED EMBODIMENTS

The mass spectrometer shown in FIG. 1 consists essentially of an ion source 1, a quadrupole field 2 as is disclosed in U.S. Pat. No. 2,939,952 to W. Paul et al., 1960 and a succeeding energy-discrimating field 3.

The ion source 1 may consist of a cathode 4, an electron accelerating electrode 5 through the aperture of which an electron beam 6 enters an ionizing space 7 containing the substance to be analysed, typically molecules of a substance are ionized, and an ion optic 8 by which ions formed by collision of the electrons with particles of the substance are extracted from the ionizing space 7 and are transmitted in the form of an ion beam 9 in axial direction into the quadrupole field 2.

The quadrupole field or mass filter 2 includes four poles 10 to 13 in the form of cylindrical rods which are mounted parallel to one another and disposed symmetrically about a central axis aligned with the axis of the ion beam 9. The function of the quadrupole mass filter can be improved by using pole rods with a hyperbolic curvature in cross section. A high frequency quadrupole field of certain symmetry is created within the space between the poles 10 to 13 by applying electrical field voltages from a field voltage source 14 to the poles 10 to 13 in such a manner that ever two opposite poles are lying at the same potential. The field voltage source 14 may deliver an A.C. voltage V · cos$\omega t$ and a D.C. voltage U, both independently adjustable or it may deliver only an adjustable A.C. voltage.

In the embodiment of FIG. 1 the energy-discriminating field 3 succeeding the quadrupole mass filter 2 consists of an entrance electrode 15 of the energy-discriminating field identical with the exit electrode of the quadrupole mass filter 2, a net-shaped electrode 16 spherical to the center of entrance electrode 15 and a spherical retarding electrode 17 arranged concentrically to the electrode 16. Entrance electrode 15 and electrode 16 both are connected to ground whereas the retarding electrode 17 is connected to a field voltage source 18 which preferably consists of an adjustable D.C.-voltage source but may also consist of an A.C.-voltage source. The ion current at the retarding electrode or collector 17 can be indicated by an amplifier-indicator 19,20. The function of the mass spectrometer may be understood from the following discussion.

In the known mass filters with quadrupole field it is necessary to apply a D.C.-voltage U in addition to the A.C.-voltage V · cos$\omega t$ in order to obtain a suitable slope of the so-called scan line $a/q$=const. in FIG. 2, preferably in the vicinity of the upper point of the triangular area of stability, so that it is possible to detect successively different mass numbers by variation of the field voltages U and V · cos$\omega t$. Also other straight or curved scan lines may be realized, i.e., by other variations of the field voltages as by variation of the angular frequency $\omega$ or by variation of other factors influencing the slope of the trajectories. With the present mass filter the D.C.-voltage U can be omitted because mass separation is performed by help of the succeeding energy analysing field 3 as will be described more detailed hereinafter.

The field distribution in the quadrupole field is so that an ion entering the quadrupole field from the left side in an axial direction will oscillate with a certain amplitude about the axis of the quadrupole field and simultaneously will continue the flight towards the exit of the quadrupole field at the right end. The path lines or trajectories of ions which are let through the quadrupole field are called stable trajectories, all other trajectories unstable, because the amplitude of oscillation of the ions during its way through the quadrupole field increases to such an amount that the ion will impinge one of the poles 10 to 13 and thereby will be lost from the beam.

With given values of field voltages the stability or unstability is dependent on the mass of the ions concerned. In the known quadrupole field D.C.-voltage U and A.C.-voltage V · cos$\omega t$ can be chosen alternatively so that in the manner of a band-pass filter a certain mean range of masses of more or less bandwidth (smallest band width at the upper point of the stability triangle) or in the manner of a high-pass filter all masses beyond a chosen light mass up to heaviest masses will pass the quadrupole field.

With the known mass filter as well as with the new mass filter of FIG. 1 the second mode of operation (high-pass filter) will result if only the A.C. voltage V · cos$\omega t$ is applied to the poles 10 to 13 of the quadrupole field and if simultaneously the field voltage source 18 is adjusted to zero, so that no energy discriminating field is operative. Then the scan line $a/q$=const. in the stability diagram falls into the axis $q$ (compare FIG. 2) and the ion current will follow a stepwise line as shown in FIG. 3.

The stability parameter $q$ is related to the mass number M and the A.C. amplitude V by the equation $q=4eV/Mr^2\omega^2$ wherein $e$ is the electron charge, $r$ is the radius of the quadrupole field; that is, the distance from rods 10–13 to the central axis about which they are symmetrical, and $\omega$ is the angular frequency of the A.C.-voltage V. As is known and disclosed at line 29 of column 5 in U.S. Pat. No. 3,129,327, the parameter $a$ is related to the mass number M by the equation $a = 8eU/Mr^2\omega^2$. As may be seen from FIG. 2 the trajectories of ions of a certain mass number remain stable as long as the value of parameter $q$ is lower than $q_o$. Further increasing of V will result in instability of trajectories of these ions thereby producing a step spectrum as is shown in FIG. 3. If there are ions of different mass numbers as for instance $M_1$ and $M_2$ with $M_1 < M_2$ then the point $q_o$ of instability will be reached by $M_1$ at A.C. voltage $V_1$ and by $M_2$ at A.C. voltage $V_2$ different from $V_1$.

The step-spectrum of FIG. 3 compared with a peak-spectrum has the disadvantage that small step signals above a high background will disappear within the background noise. Therefore, the step-spectrum mostly is not used for obtaining an allround mass registration. However, the step spectrum is important for determination of the transmission of the mass filter because the mass filter has a maximum of transmission in the horizontal parts of the step spectrum. Therefore, the step spectrum is useful to obtain a high sensitivity of detection of very small quantities of ions unless heavier masses simultaneously will produce a high background.

According to the invention also in the absence of a D.C. voltage U at the poles 10 to 13 of the quadrupole field 2 a peak spectrum may be obtained by having an operation of the energy discriminating field 3 upon the ions passing the exit of the quadrupole field.

In the embodiments of FIGS. 1,5,6 and 7 this succeeding field 3 consists of an energy barrier discriminator in which a retarding electrode 17, 15′ or 15″ is provided as an energy barrier which decelerates all ions below a given threshold, so that they cannot reach the retarding electrode or collector 17. This energy threshold is defined by the amount of the adjustable field voltage. With D.C. voltage U switched off just those ions are mostly energetic the trajectories of which within the quadrupole field are associated to working points at the marginal zone (area A) of the stability diagram. Therefore, it is possible to obtain a peak-spectrum within a certain range of mass numbers by alteration of the amplitude or frequency of the A.C. voltage V · cos$\omega t$ for the quadrupole field 2, so that the step spectrum (FIG. 3) at the output of the quadrupole field is changed to a peak spectrum (FIG. 4) at the output of the energy discriminating field 2 (compare FIGS. 3 and 4). Preferably this method is suitable for the analysis of heavier masses.

The form of the fringing fields at the exit and at the entrance of the quadrupole field 2, will influence the course of the trajectories so that the separation of ions of certain masses is determined by fringing fields at the entrance as well as the exit of the quadrupole field and can be changed by convenient geometric means at the entrance and/or exit of the quadrupole field. These influences can be verified empirically and may be stated or changed by using trimming means.

The invention makes it possible to provide mass filters which in analogy to mass spectrometers with magnetic mass separation furnish a high sensitivity and high resolution at heavier masses. FIGS. 5 and 6 are showing embodiments in which the retarding electrode consists of an apertured disk lens 15' and net-shaped electrode 15'', which is connected to the field voltage source 18 and is followed by a conventional collector 17'.

FIG. 7 is showing an embodiment in which the retarding electrode 17' is identical with the ion collector. The exit electrode of the quadrupole mass filter 2 may be but must not be a net-shaped electrode 15''.

The invention may also be used in connection with a conventional multi-pole mass filter different from the quadrupole filter after PAUL and especially having more than four pole electrodes.

It is within the scope of the invention to derive a line mass spectrum from a mass filter operated in a broad band or high-pass filter mode by a succeeding energy discrimination of the transmitted ions.

The broad band or high-pass ion current may be obtained by shifting the mass specific working points within the stability diagram beyond said upper margin by variation of any means suitable for changing the parameters *a* and/or *q*.

This invention utilizes an effect which upon to date has not yet been recognized and utilized to obtain a peak spectrum of masses by a quadrupole mass-filter. The usual manner to obtain a peak spectrum from a quadrupole filter is to operate it in the manner of a narrow band filter (compare FIG. 2 of the application) thus, that the line $a/q$ = const. will run through the upper tip (apex) of the triangular area of the stability diagram of FIG. 2. This method suffers from the disadvantage that such a mass filter, operated as a narrow band filter, at the tip of the diagram, exhibits a serious loss of transmission efficiency for high ion masses.

In order to overcome this disadvantage the present invention makes use of a ratio $a/q$ such that the mass filter transmits a broad band of ion masses. In FIG. 2 is shown such an inclined line $a/q$ = const. and the preferred $a/q$-line is that with inclination zero which inclination is obtained by using only an A.C.-potential at the poles of the quadrupole-filter.

Scanning in connection with a low inclination as outlined above will not yet give a peak spectrum but a broad band characteristic as is shown in FIG. 3.

The invention does not use an energy analysing device in the conventional manner which would be to subject all ions simultaneously passing the quadrupole filter to an energy analysing procedure. What is done by the invention is not at all the plotting of a spectrum of energy of ions passing simultaneously the quadrupole filter as usually is done by an energy analysing device as in U.S. Pat. No. 2,911,532 of Tipotsch.

The customary use of an energy analysing device as for instance is shown by Tipotsch in connection with an RC oscillator, is only practicable on account of known relationships between mass numbers and energies of corresponding ions within such RC oscillators. Such known relationship, however, is not valid within a quadrupole filter and especially is not valid near the margin of stability of a quadropole filter diagram. The energies of transmitted ions near the margins of said area of stability and especially near the right margin of this area are essentially higher than the energies of the same ions (same masses) more away from said margins within the area of stability. Before changing over from stable to unstable trajectories ions suddenly take over additional energy. The use of this phenomenon is a feature of the invention.

In order to utilize this phenomenon it is necessary to change the voltages of the quadrupole filter in such a manner that successively the ions of interest will change over from stable to unstable trajectories and in order to make recognizable or perceptible said sudden change of energy it is only necessary to subject the transmitted ions to an energy discriminating procedure as a function of the potential change within the quadrupole filter, in order to indicate said peaks of energy due to said phenomenon.

The change-over from stable to unstable trajectories takes place always if the alternating voltage of the quadrupole fiter passes a step point within the mass filter step curve of FIG. 3 because then ions of the next higher or next lower mass number will change over from stable to unstable path or vice versa. However, consideration of the above discussion will have shown that the peak spectrum of FIG. 4 is no mathematical differentiation of the curve of FIG. 3.

Therefore, it is important that the mass filter is operated in a broad band or high path mode and that a scanning procedure is performed by variation of the A.C.-field voltage $V \cdot \cos \cdot \omega t$ and/or D.C. field voltage U (if any), thereby shifting the area of stability for the different masses or ions near the boundary of stability and that simultaneously ions which pass the mass filter on stable paths at the output are subjected to an energy discriminating procedure those transmitting the ions of increased kinetic energy.

The resulting peak spectrum is not a spectrum of masses as a function of energy of the respective ions but is a peak spectrum as a function of the voltages of the quadrupole filter and the indication of masses is only a result of the above-discussed phenomenon of sudden increase of energy at the changeover from stable to unstable trajectories of the respective ions.

What is claimed is:

1. A method of mass analysis by ionization and mass separation which method includes the steps of,
   - ionizing molecules of a substance to be analysed,
   - establishing a high frequency electric field with a quadrupole filter having opposed pairs of poles receiving a field voltage symmetrically disposed about an axis parallel to the poles to selectively establish stable and unstable trajectories of the ions of the ionized molecules associated with working points at the marginal zone of a stability diagram having a lower stability limit related to a predetermined cutoff mass,
   - performing a scanning operation on the ion beam transmitted by the quadrupole filter by varying the field voltage thereby shifting the lower stability limit towards higher or lower masses and thereby imparting increased energy to those ions substantially of that cutoff mass, and subjecting the transmitted ions to an energy discriminating procedure thus indicating or filtering only the current of ions of increased energy of said predetermined cutoff mass as a function of said field voltage.

2. A method of mass analysis in accordance with claim 1 wherein only an A.C. potential is applied to said poles whereby only masses above a predetermined cutoff mass related to said A.C. potential are transmitted.

3. A method of mass analysis by ionization and mass separation which method includes the steps of, ionizing molecules of a substance to be analysed, establishing a high frequency electric field with a quadrupole filter having opposed pairs of poles symmetrically disposed about an axis parallel to the poles, applying potentials to said poles to selectively establish stable and unstable trajectories of the ions of the ionized molecules associated with working points at the marginal zone of a stability diagram having a lower stability limit related to a predetermined cutoff mass, said quadrupole filter being characterized by a relationship $a = f(q)$ corresponding to stable and unstable ion trajectories wherein $a$ and $q$ are defined by the equations.

$$a = 8e\ U/Mr^2\omega^2$$

$$q = 4e\ V/Mr^2\omega^2$$

in which $e$ = elemental charge = $1,602 \cdot 10^{-19}$ coulomb

U = D.C. potential applied to the poles

V = A.C. potential applied to the poles

M = mass of the particles $r$ = distance from the central axis to the rods $\omega$ = angular frequency of V, changing said A.C. potential V and said D.C. potential U, if any, to perform a scanning operation on the ion beam transmitted by the quadrupole filter thereby shifting the lower stability limit towards higher or lower masses and thereby imparting increased energy to those ions substantially of that cutoff mass, and subjecting the transmitted ions to an energy analyzing procedure within an electric field analyzing means to provide a peak spectrum with each peak occurring at a respective value of said A.C. potential V and D.C. potential U, if any, representative of a corresponding mass number corresponding substantially to said predetermined cutoff mass as a function of said potentials.

4. A method of mass analysis in accordance with claim 3 werein said D.C. potential U is zero and only said A.C. potential V is applied to said poles whereby only masses above a predetermined cutoff mass related to said A.C. potential V are transmitted.

* * * * *